United States Patent

Johnson

[15] 3,680,649
[45] Aug. 1, 1972

[54] FLUENT MATERIAL WEIGHING SYSTEM

[72] Inventor: Allie A. Johnson, Route 1, Pulaski, Tenn. 38478

[22] Filed: June 19, 1969

[21] Appl. No.: 834,785

Related U.S. Application Data

[63] Continuation-in-part of Ser. No. 689,456, Dec. 11, 1967, Pat. No. 3,460,641.

[52] U.S. Cl. ...................................................177/99
[51] Int. Cl. ..............................................G01g 13/22
[58] Field of Search...................................177/90-99

[56] References Cited

UNITED STATES PATENTS 2,919,100  12/1959  Rush..............................177/91
2,345,287  3/1944   Peterson.........................177/98
3,093,202  6/1963   Sanderson......................177/96
3,098,537  7/1963   Petrea..........................177/93 X
3,456,748  7/1969   Allen et al. ....................177/92

*Primary Examiner*—Richard B. Wilkinson
*Assistant Examiner*—George H. Miller, Jr.
*Attorney*—C. A. Phillips

[57] ABSTRACT

A fluent material weighing system which accepts fluent material on a continuous flow basis, then batch weighs the material, simultaneously weighing one batch and discharging another, and finally, discharging the material on a continuous flow basis.

14 Claims, 8 Drawing Figures

Allie A. Johnson,
INVENTOR.

BY

C. A. Phillips
ATTORNEY.

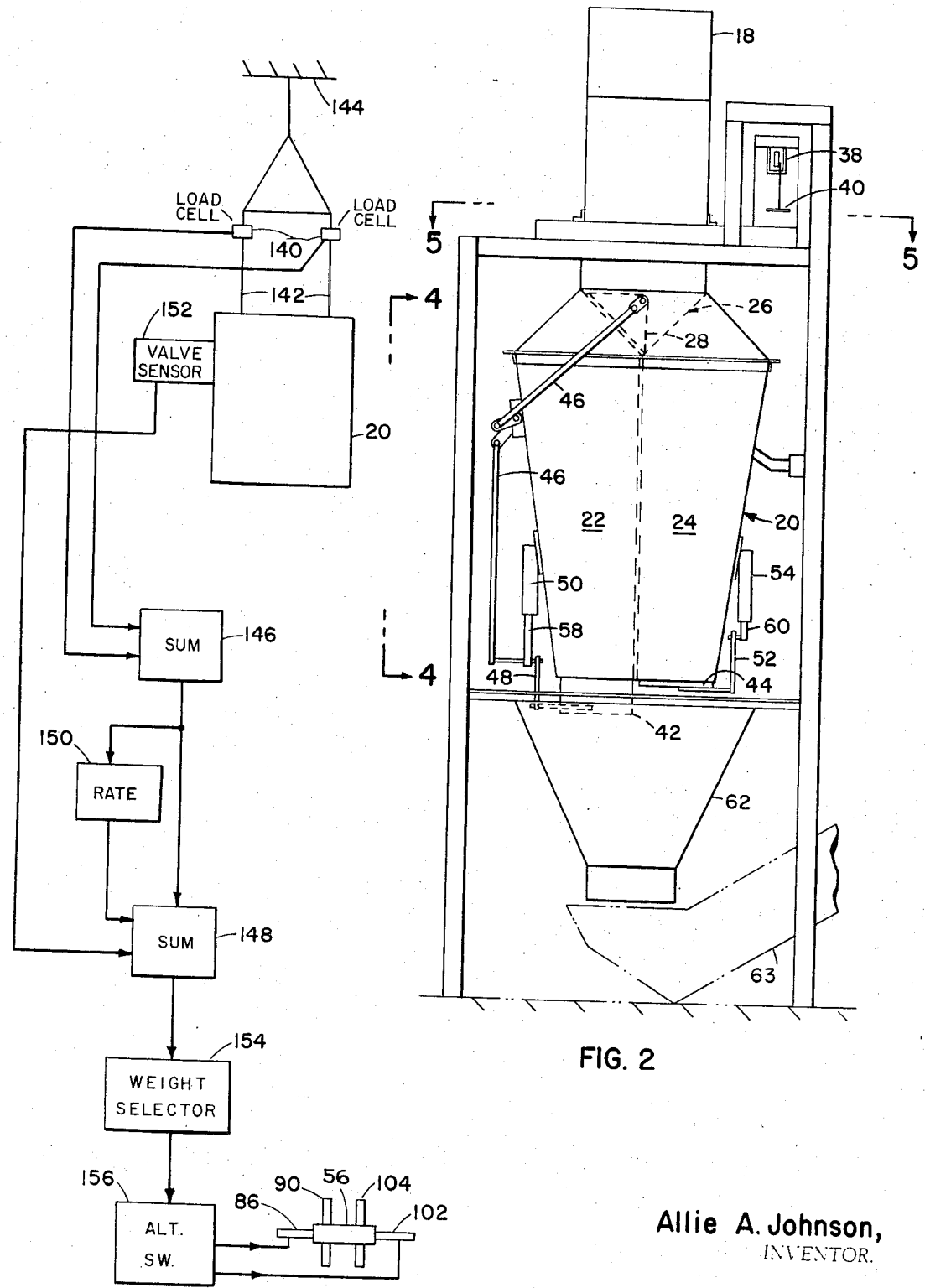

Allie A. Johnson,
INVENTOR.

BY

C. A. Phillips
ATTORNEY.

FLUENT MATERIAL WEIGHING SYSTEM

This application is a continuation-in-part of a prior application entitled "Fluent Material Weighing System," Ser. No. 689,456, filed Dec. 11, 1967, now U.S. Pat. No. 3,460,641.

This invention relates to devices and systems for weighing fluent materials such as fertilizer and grains and particularly to a system of this category for accurately weighing such material without interruption of the flow of the material.

The weighing of fluent materials such as sand, lime, fertilizer, feed, etc. may be achieved by basically two approaches, continuous weighing as by a belt system where the weight passing a point at a known rate permits calculation of a total weight delivered in a known time, or by batch weighing, normally by beam balance systems where a hopper or container is filled, flow shut off, and the batch weighed. In general the continuous weighing systems are more susceptible to error and are principally used for the weighing of less valuable materials, sand, lime, etc. and the batch weighers, generally providing greater accuracy, are employed for weighing more valuable products such as feed, seed and fertilizer.

The difficulty in the past has been that batch weighing is generally slower than continuous weighing which significantly adds to the cost of handling the latter class of products.

It is an object of the present invention to overcome the difficulties and disadvantages of the prior art by providing a weighing system which will permit rapid weighing of fluent materials essentially on a continuous flow basis but with the accuracy of batch weighing.

It is a further object of this invention to provide a continuous flow weighing system wherein inaccuracies because of variations in rate of flow are reduced or eliminated.

It is a still further object of this invention to provide a continuous flow weighing system wherein material is fed to the system in such a manner that produces even weighing forces on the weight sensor of the system.

It is a still further object of this invention to provide a continuous flow weighing system that is adapted to the filling of containers.

In accordance with this invention a continuous flow of material to be weighed is fed to a hopper assembly which is supported by a weight sensor, either of the electrical load cell type or mechanical balance type. The hopper assembly includes two chambers or receptacles and flow is alternately directed by an input valve to one receptacle and then to the other. As a particular feature of this invention, the input valve is made integral with the hopper assembly or otherwise adapted and connected with it wherein it is part of the load weighed by the weight sensor. As another feature of this invention, by incorporating the input valve into the hopper assembly an extremely short drop between the valve and filled chambers can be achieved and thus little material flows into a chamber after the input valve has switched flow to the other container. Of course, this enhances accuracy. As a feature of one mode of the invention, chambers are fixed mounted containers and the system is adapted for the continuous acceptance and discharge of weighed material in bulk form. The containers are each provided with gate valves which are operated together with the input valve to fill one container until a predetermined weight is sensed and then to commence filling the other. While one container is being filled, the other is being dumped.

As a still further feature of the invention, it is particularly adapted to the use of existing platform type scales wherein the platform cover of the scales may be removed, partially or completely, and material flow may be directed into the input valve through the platform supporting frame, the frame being supported through appropriate linkage and lever arms to the balance arm of the scales. In order to save height, the vertical post extending from the base of the scales up to the balance arm is shortened.

As still a further feature of the invention, it is adaptable to include electrical weighing devices such as load cells and in such instance the invention provides for automatic compensation of the system for variations in rate of flow of material through the inlet valve and time required for the inlet valve to reverse position.

These and other objects, features and advantages of the invention will become more apparent from the following description when considered together with the drawings in which:

FIG. 2 is a front elevational view of the invention as shown in FIG. 1;

FIG. 8 is a schematic illustration of the system of the invention wherein load cells are used as weighing units.

Figure 1:
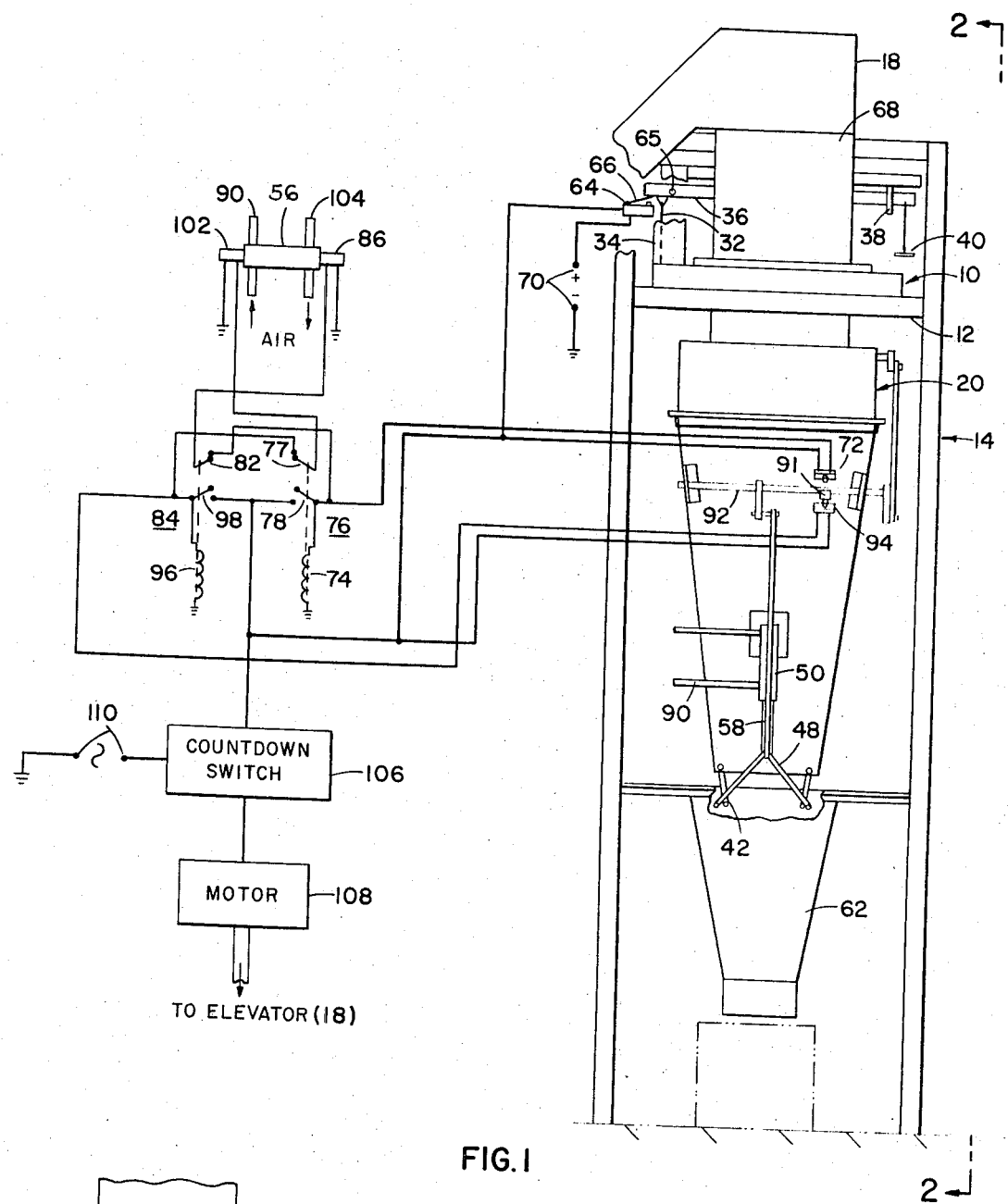
FIG. 1 is a side elevational view showing mechanical features of the invention together with a schematic illustration showing an embodiment of the control system of the invention.
Figure 3:
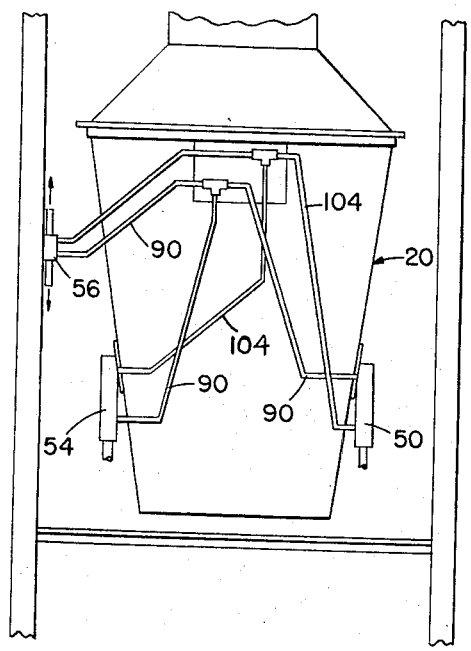
FIG. 3 is a side view of the invention as shown in FIG. 1 illustrating the hydraulic system of the invention.
Figure 4:
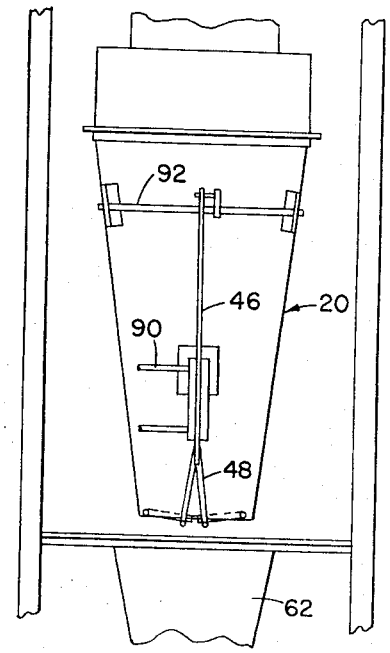
FIG. 4 is a partial rear elevational view as seen along lines 4—4 of FIG. 2.
Figure 5:
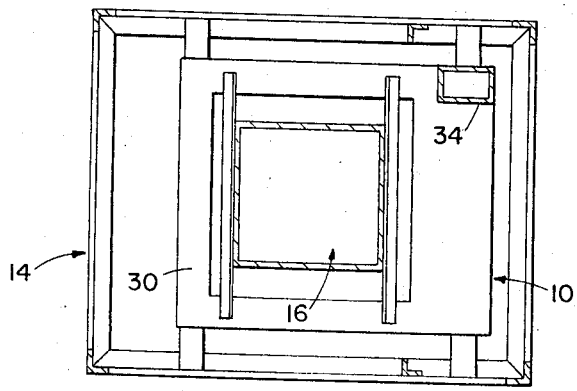
FIG. 5 is a sectional view along lines 5—5 of FIG. 2.

Referring now to the drawings and particularly to FIGS. 1–5, a standard platform scales 10, modified as will be described, is positioned and supported by top horizontal frame members 12, of frame 14. The usual top platform member of scales 10 is removed from scales, or a portion cut out, when used in this application and, as shown, FIG. 5., there is left an opening or passageway 16 through which material to be weighed is fed by means of elevator 18 to hopper assembly 20. Hopper assembly 20 has two chambers, chamber 22 and 24, which are fed, respectively, through inlet valve 26, dependent upon the position of flow valve or diverter 28. With diverter 28 in the position shown, chamber 24 would be filled. Weighing platform frame 30 (FIG. 5) is coupled by appropriate linkage, including rod 32, up through column 34 to balance arm 36. Platform frame 30 supports hopper assembly 20 and thus weighs hopper assembly 20, as read out on balance arm 36 by pea 38. Typically, the tare represented by the empty weight of hopper assembly 20 would be counter balanced by counter balance 40 and thus net weight may be directly read out and selected by pea 38. Bottom gate valve 42 opens and closes chamber 22 and bottom gate valve 44 and performs the same function for chamber 24. Diverter 28 of inlet valve 26 is connected through linkage assembly 46 to operate with gate valve 42. Gate valve 42 is, in turn, operated through linkage assembly 48 by air cylinder 50, and gate valve 44 is operated through linkage 52 by air cylinder 54. The air feed system to cylinders 50 and 54 is illustrated in FIG. 3, the cylinders being oppositely connected to electrically operate four-way valve 56 so that when piston 58 of cylinder 50 is extended to open gate valve 42, the piston 60 of cylinder 54 is withdrawn to close gate valve 44. Coordinately, the position of diverter 28 is such that flow be directed to the chamber which is closed, as illustrated in FIG. 1. Weighed material is discharged through funnel shaped trough 62 to elevator or conveyor 63 which conveys the material to a point of storage or to a vehicle which may be loaded directly from the system with a precise weight.

Plunger or lever operated switch 64 is mounted on a supporting frame portion of scales 10. Switch 64 is positioned with lever 66 to close its circuit by engagement with balance arm 36 when balance arm 36 is precisely horizontal, representing weight balance between the applied weight load and balance arm 36. The actual linkage between weighing platform frame 30 and arm 36 is conventional except that vertical rod linkage 32 up to balance arm 36 is shorter.

In operation, with diverter 28 in the position shown in FIG. 2, material to be weighed is drawn upward by elevator 18 and dropped down through chute 68, through inlet valve 26 into chamber 24. As will be observed, chamber 24 is closed at the bottom and material flow will continue until the weight preset on balance arm 36 by pea 38 in chamber 24 is reached. At this point arm 36 will rotate about pivot 65 to a horizontal position whereupon lever arm 66 will be depressed closing normally open switch 64. Power from source 70 will then be supplied through normally closed limit switch 72 to coil 74 of relay 76, which opens normally closed contacts 77 and closes normally open contacts 78, the latter contacts serving to hold on relay 76 after switch 72 has been opened. This holding function is accomplished by one of contacts 78 being connected to coil 74 and the other connected directly to switch 64. Power is also supplied through normally closed contacts 82 of relay 84 to coil 86 of four way electrohydraulic valve 56 which then applies pressure to air line 90 to operate air cylinder 50 to reverse the position of diverter 28 and to close gate valve 42, closing chamber 22. At the same time, cylinder 54 is energized which causes gate valve 44 to open, opening chamber 24 which discharges the weighed load. Discharge is through trough 62 onto conveyor 63 which then conveys the material to a desired point for storage or loading.

When diverter 28 is moved, cam 91 on shaft 92, which shaft is a part of the linkage between cylinder 50 and diverter 28, alternately operates normally closed switches 72 and 94. Thus when diverter 28 is moved to its new position as described above this sequence occurs: first, switch 64 closes and this causes coil 74 of relay 76 to be energized closing contacts 78 which serve to hold power on coil 74 and relay 76 in an operated mode; second, contacts 77 are opened which prevents power from being prematurely applied to coil 102 after normally closed switch 94 closes; third and next, switch 94 is operated closed energizing coil 96, closing normally open contacts 98 to hold on coil 96 and opening normally closed contacts 82 deenergizing coil 86; fourth, cam 91 opens switch 72; and fifth, when material drops from now open chamber 24, balance arm 36 drops down opening switch 64 which deenergizes both relays 76 and 84 to reset the circuit for the next operation.

In the new posture with gate valve 42 closed, material is diverted into and retained in chamber 22. When the weight of material in chamber 22 reaches the predetermined weight, as set by pea 38, for cutting off, switch 64 is again operated and the following sequence occurs. Power is supplied through switch 64, through now closed switch 94, to coil 96 of relay 84 and through normally closed contacts 77 of relay 76 to coil 102 of four-way valve 56. The result is that instantly valve 56 pressurizes line 104 (FIG. 3) and opens line 90. This causes air cylinder 50 to open gate valve 42 and reverse the position of diverter 28 to direct flow to chamber 24. At the same instant, air cylinder 54 is energized to close gate valve 44 and thus chamber 22 is dumped and chamber 24 commences filling.

Premature energizing of coils 86 or 102 of valve 88 is prevented by the dropout time of contacts 82 and 77 which is sufficient time for power to be removed from the circuit when switch 64 opens. An essential feature of the invention is that switches 72 and 79 d are not closed by the operation of cam 91 until contacts 82 and 77, respectively, of relays 84 and 76, have been operated open.

The process as described will continue and weighing continue so long as desired. By selecting a predetermined weight for scales 10, say 100 pounds, if it is desired to weigh a ton of material, it is only necessary to permit operation of the unit 20 times. By using a conventional count-down switch 106 preset to the desired number of container loads, and controlling elevator motor 108 of elevator 18, it is relatively simple to precisely weigh any quantity of material. Switch 106 is connected at terminals 110 and each time the scales come to balance, count down switch 106 is energized and when it counts down the required number of operations, power applied from source 110 through count down switch 106 to elevator motor 108 is turned off, halting flow.

While air cylinders are used in the embodiments of the invention shown herein, it is to be appreciated that appropriate use of long throw solenoids may be employed instead.

Figure 6:
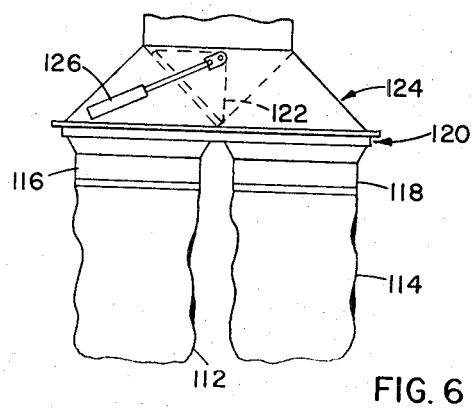
FIG. 6 is a partial front elevational view of an embodiment of the invention wherein the invention is adapted to fill removable containers.

FIG. 6 illustrates a modification of the invention wherein chambers 22 and 24 of hopper assembly 20 (as shown in FIG. 2) are eliminated and instead removable containers, such as paper or burlap bags 112 and 114 are removably supported by bag holders 116 and 118 at the top portion of a hopper assembly 120 and are directly supplied material by diverter 122 of inlet valve 124. In this instance, it is, of course, unnecessary to provide for gate valves 42 and 44, air cylinders 50 and 54 and connecting linkages. Instead, a single air cylinder 126 alone is used to operate diverter 12 which operates in the same fashion as described above with respect to cylinder 50 with respect to air valve 56.

Figure 7:
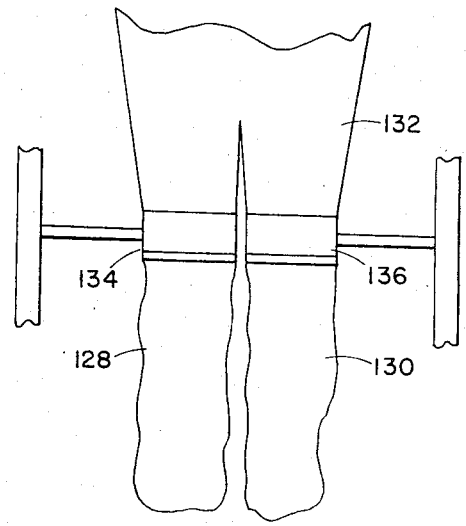
FIG. 7 is a partial front elevational view of a modification of the invention illustrated in FIG. 6.

FIG. 7 illustrates a modification embodiment of the invention shown in FIG. 6 wherein removable containers 128 and 130 are to be filled and which are positioned at the bottom of hopper assembly 132, where they are removably held by bag hangers 134 and 136.

While the hold and release mechanism for the bag hangers are not shown in detail in FIGS. 6 and 7, it is to be understood that they may be also controlled by the hydraulic system of the invention wherein the bags are automatically released and dropped upon the operation of diverter valve 28 or 122, and/or air cylinders 50 and 54, or 126.

As will be observed, using a container filling system as shown in FIGS. 6 and 7, wherein the containers are completely suspended, no portion of the weighing system need not be under the bags, and thus, it is very simple to provide conveyor means on to which the bags may be dropped after being filled to rapidly move them to a storage or loading point.

FIG. 8 shows diagrammatically, still another embodiment of the invention wherein the weighing unit is a load cell system employing one or more load cells. Typically, two or four load cells 140 would be employed to suspend in a balanced arrangement a hopper assembly 20 of the type shown in FIG. 1. In one form of load cells an electrical strain gauge or gauges are closely coupled to a beam or beams which are deformed as a function of applied weight and thus provide electrical output proportional to weight. The strain gauges are typically of the variable resistance type wherein resistance and thus current through them changes with deformity of the beam produced by weight load.

As shown, hopper assembly 20, is suspended through flexible cables 142 by load cells 140 which in turn are affixed to a frame or other supporting member 144. The outputs of load cells 140, which respond only to vertical forces by virtue of the flexible suspension system, are added in summing unit 146 to provide a total weight indication of hopper assembly 20, part of the weight being borne by each load cell 140. Depending upon the unbalance to be anticipated in suspending hopper assembly 20, either two or four load cells would be required. The output of summing unit 146 is fed as a first input to summing unit 148. The output is also fed to rate circuit 150 which derives a signal which is a function of the rate of change of weight sensed by load cells 140 as material flows into hopper assembly 20 and thus the output is an electrical indication of the rate of flow of material. This rate signal is then fed as a second input to summing unit 148 where it is used as a compensating signal to correct for variations in weight arising out of variations in material suspended in air between diverter 28 and chambers 22 and 24 (FIG. 2) at the instant of operation of diverter 28. This variation is caused largely by variations in rate of flow of material. Further, since it requires a finite time to cause diverter 28 to switch from one position to another, and thus there is a quantity of material which flows into a container after a closing signal for that chamber has been given which depends upon this time, some compensation for it must be made. If it is assumed that the time is constant for each operation or accuracy is otherwise sufficient, then no means other than a constant factor relating to the rate of flow need be provided, which would be electrically incorporated in rate circuit 150. Where very precise control is required, the time of change of diverter 28 from a first position to a second position, and the time of change from the second position back to the first position, would be sensed by valve sensor 152, typically on input from switches 72 and 94 (FIG. 1), and an appropriate compensation signals would be applied to summing unit 148, which together with the weight signal and rate of flow signal provide a composite output to weight selector switch 154 and provides precisely timed adjusted switching signals to provide extremely accurate weighing. Weight selector switch 154 includes an adjustable voltage source calibrated in terms of weight and an electrical coincidence or comparator switching circuit which operates contacts of a normally open relay when a selected weight is reached as indicated by identity between the output of sensing circuit 148 and the output of the adjustable voltage source. The output of weight selector 154 is then fed to alternate output switch 156 which alternately operates coils 86 and 102 of four-way valve 26 and gate valves 42 and 44 in a manner described with respect to the system of FIG. 2. Alternate output switch 156 consists of the combination of switches 72 and 94 and the normally open contacts of the relay output of weight selector 154 which functions together as described above for the operation of switches 64, 72 and 94.

It is believed that the foregoing specification describes an improved weighing system which provides a solution to a frequent need for increased accuracy and speed in the bulk and container weighing of fluent materials.

I claim:
1. A fluent material weighing system comprising:
A. a supporting member;
B. weight sensing means supported by said supporting member and adapted to weigh an applied load and for producing, alternately, first and second electrical outputs as, periodically, a predetermined suspended weight is sensed;
C. a hopper assembly connected to said weight sensing means as said applied load and comprising:
 1. first and second weighing chambers, each being adapted to receive material through a top opening,
 2. inlet valve means positioned at the top of said hopper assembly for receiving a continuous flow of material and directing flow, selectively, to said first and second chambers,
 3. a first gate valve positioned at the bottom of said first chamber for selectively opening and closing the bottom of said first chamber, and
 4. a second gate valve positioned at the bottom of said second chamber for selectively opening and closing the bottom of said second chamber, whereby said first and second weighing chambers, said inlet valve and said first and second gate valves are weighed together;
D. control means connected to said inlet valve means and said first and second gate valves and being responsive to a said first electrical output of said weight sensing means for operating said inlet valve means to direct flow into said first chamber, for operating said first gate valve closed and for operating said second gate valve open, and responsive to a said second electrical output of said weight sensing means for operating said inlet valve means to direct flow into said second chamber, for operating said second gate valve closed and for operating said first gate valve open.

2. A fluent material weighing system as set forth in claim 1 wherein said weight sensing means includes:
   A. a source of electrical power;
   B. a normally open electrical switch connected to said source of electrical power for providing an electrical output when a said predetermined suspended weight is sensed;
   C. first and second relays, each having a relay coil, a set of normally open contacts and a set of normally closed contacts;
   D. first and second normally closed switches positioned to be alternately opened when engaged by said inlet valve means as said inlet valve means is operated to permit flow to said first chamber and then to said second chamber.
   E. a first electrical circuit coupling an output of said normally open switch through said first normally closed switch to said coil of said first relay and to a normally open contact of said first relay and through the normally closed contacts of said second relay to provide said first electrical output;
   F. a second electrical circuit from the output of said normally open switch through said second normally closed switch to said coil of said second relay and to a normally open contact of said second relay and through said normally closed contacts of said first relay to provide said second electrical output; and
   G. a third electrical circuit from the output of said normally opened switch to the otherwise unconnected contact of said normally open contacts of said first and second relays, whereby upon the closing of said normally opened switch a said relay coil is held energized after its associated normally open contact has been closed, holding power on said last named relay coil until said normally opened switch is next opened.

3. A weighing system as set forth in claim 1 wherein said control means comprises:
   A. a source of air;
   B. an electrically operated four-way air valve for providing first and second output conditions;
   C. a first cylinder supplied air through said four-way air valve, said first cylinder being connected to operate said inlet valve means and said first gate valve and adapted to operate said inlet valve means to open flow to said first chamber and close said first gate valve when said electrically operated four-way valve is supplied with a said first electrical output and adapted to operate said inlet valve means to open flow to said second chamber and open said first gate valve when said electrically operated four-way valve is supplied with a said second electrical output; and
   D. a second cylinder supplied air through said electrically operated four-way valve, said second cylinder being connected to said second gate valve and adapted to close said second gate valve when said four-way electrically operated valve is supplied a said second electrical output and adapted to open said second gate valve when said electrically operated four-way valve is supplied a said first electrical signal.

4. A weighing system as set forth in claim 1 wherein:
   A. said weight sensing means comprises platform scales comprising:
      1. a weighing platform comprising a horizontally positioned frame, and
      2. a balancing arm coupled to said platform for balancing weight applied to said platform;
   B. said hopper assembly is suspended from said platform and positioned to receive flow through said frame; and
   C. electrical switching means responsive to sequential operation of said balancing arm to a balanced position to provide alternately, in sequence, said first and second electrical outputs to said control means.

5. A weighing system as set forth in claim 4 wherein said electrical switching means comprises:
   A. a source of electrical power;
   B. a normally open electrical switch in engagement with said weight balancing arm and connected to said power source for providing electrical output when said balancing arm reaches a balanced position;
   C. first and second relays, each having a relay coil, a set of normally open contacts and a set of normally closed contacts;
   D. first and second normally closed switches positioned to be alternately opened when engaged by said inlet valve means as laterantely operated to permit flow to said first chamber, and then to said second chamber;
   E. a first electrical circuit coupling an output of said normally open switch through said first normally closed switch to said coil of said first relay and to a normally open contact of said first relay and through the normally closed contacts of said second relay to provide said first electrical output;
   F. a second electrical circuit from the output of said normally open switch through said second normally closed switch to said coil of said second relay and to a normally open contact of said second relay and through said normally closed contacts of said first relay to provide said second electrical output; and
   G. a third electrical circuit from the output of said normally open switch to the otherwise unconnected contact of said normally open contacts of said first and second relays, whereby upon the closing of said normally opened switch a said relay coil is held energized after its associated normally open contact has been closed, holding power on said last named relay coil until said normally opened switch is next opened.

6. A weighing system as set forth in claim 1 further comprising supply means positioned to apply fluent material to said hopper assembly through said inlet valve means.

7. A weighing system as set forth in claim 6 wherein said supply means includes count-down switching means responsive to a preselected number of operations of said weight sensing means for cutting off flow of fluent material from said supply means to said hopper assembly, whereby a selected total weight of material may be weighed.

8. A weighing system as set forth in claim 1 wherein said weight sensing means comprises:

A. at least one load cell for receiving the weight of said hopper assembly and for providing an electrically indicated weight signal proportional to the weight of said hopper assembly;

B. weight selector means responsive to an input signal for providing a switching output signal when said input signal indicates a predetermined value;

C. circuit means responsive to said weight signal for providing said input signal to said weight selector means; and D. switching means responsive to said switching output signal and the operating position of said inlet valve means for providing, alternately, said first and second electrical outputs.

9. A weighing system as set forth in claim 8 wherein said circuit means comprises:

A. flow rate means responsive to said weight signal for providing a rate signal, being a signal which is a function of the rate of change of said weight signal and thus a function of the rate of flow of material into said hopper assembly; and B. summing means responsive to said weight signal and said rate signal for providing a compensated input signal to said weight selector means.

10. A weighing system as set forth in claim 9 wherein said circuit means further comprises timing means for providing a timing signal which is a function of the period required for the operation of said inlet valve means; and said summing means comprises means responsive to said weight signal, said rate signal, and said timing signal for providing a compensated input signal to said weight selector means.

11. A fluent material weighing system comprising:

A. a supporting member;

B. weight sensing means supported by said supporting member and adapted to weigh a suspended load and for producing, alternately, first and second electrical outputs, as periodically, a predetermined suspended weight is sensed;

C. a hopper assembly connected to said weight sensing means as a said suspended load comprising:
　1. first and second receptacles, each being adapted to receive material through a top opening,
　2. inlet valve means positioned at the top of said hopper assembly for receiving a continuous flow of material and directing flow, selectively to said first and second receptacles; and D. control means connected to said inlet valve means and responsive to said first electrical output of said weight sensing means for operating said inlet valve means to direct flow into said first receptacle and responsive to a said second electrical output of said weight sensing means for operating said inlet valve means to direct flow into said second recepticle, whereby said hopper assembly, said first and second receptacles and said inlet valve means are weighed together.

12. A weighing system as set forth in claim 11 further comprising supply means to apply fluent material to said hopper assembly through said inlet valve means.

13. A weighing system as set forth in claim 11 wherein each said recepticle is a removable container.

14. A weighing system as set forth in claim 12 wherein:

A. said weight sending means comprises platform scales comprising:
　1. a weighing platform comprising a horizontally positioned frame, and
　2. A balancing arm coupled to said platform for balancing weight applied to said platform;

B. said hopper assembly is suspended from said platform and positioned to receive flow through said frame; and C. electrical switching means responsive to sequential operation of said balancing arm to a balanced position to provide alternately, in sequence, said first and second electrical outputs to said control means.

* * * * *